UNITED STATES PATENT OFFICE.

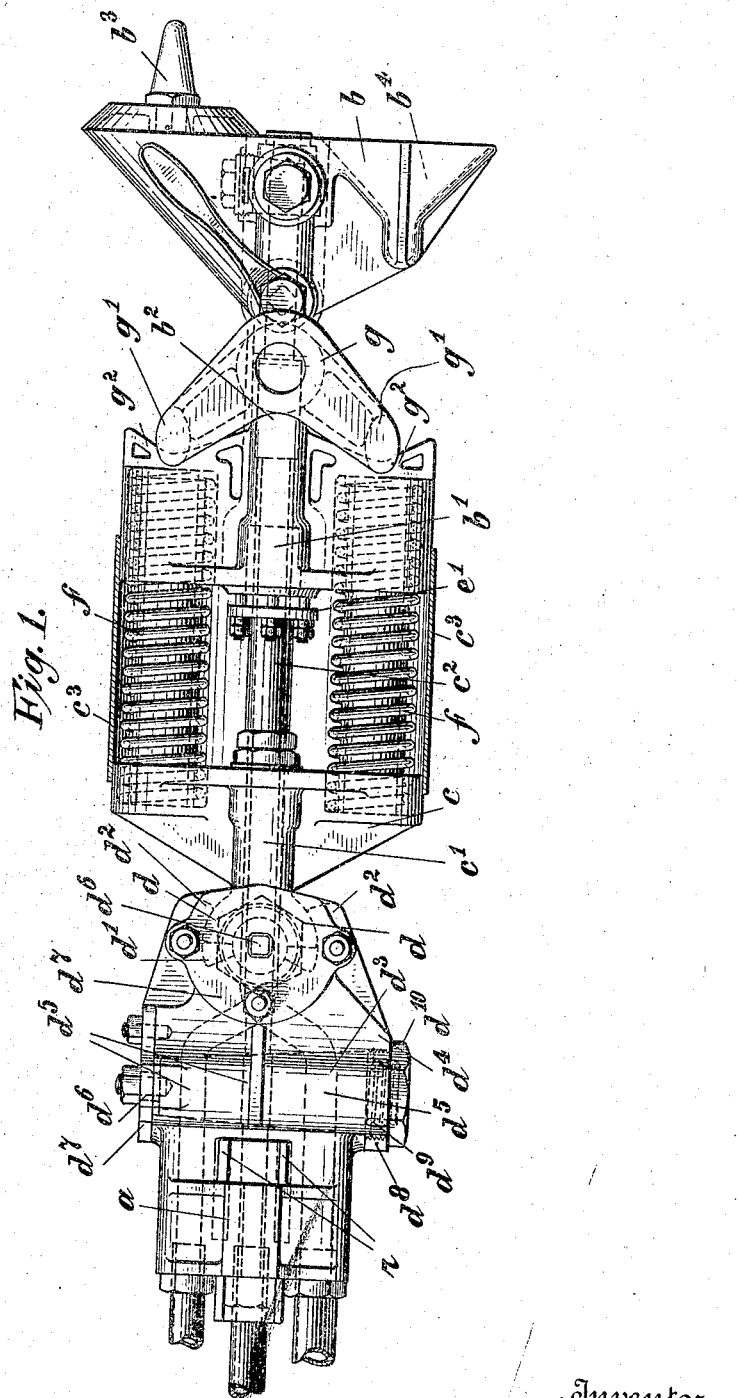

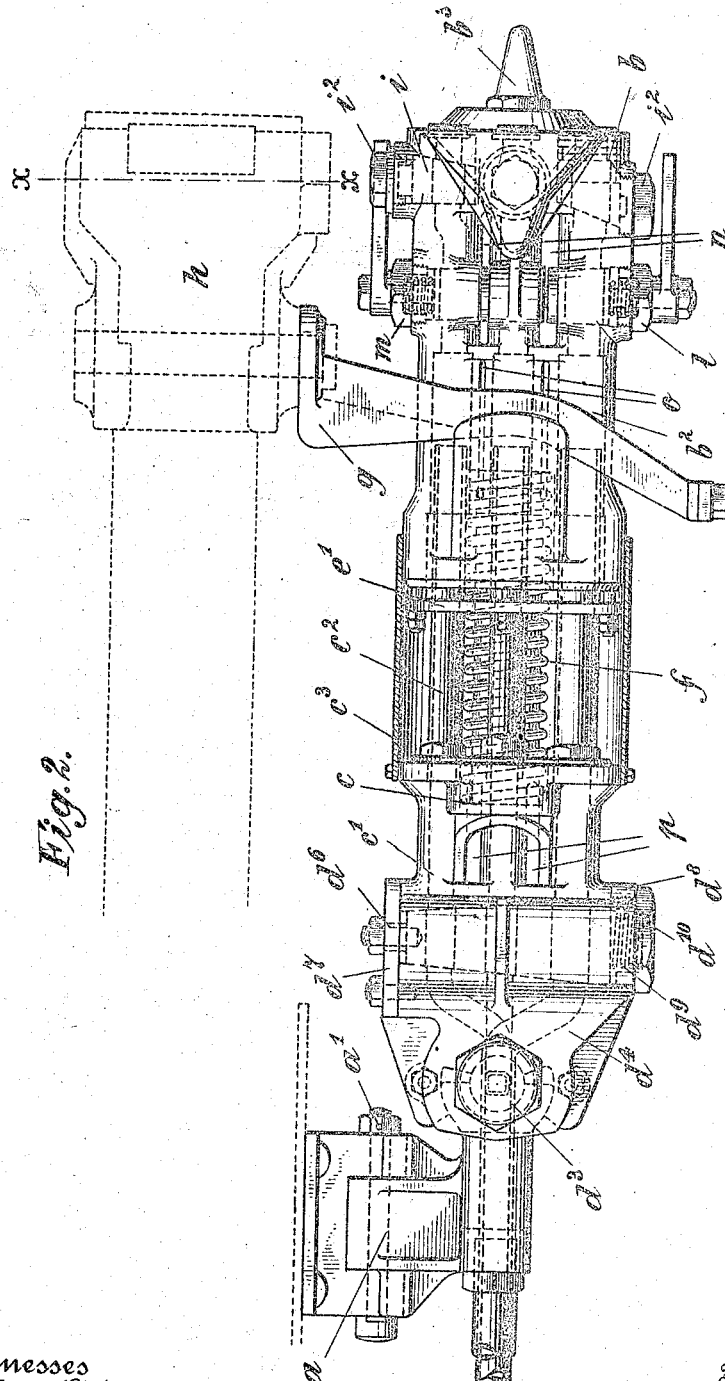

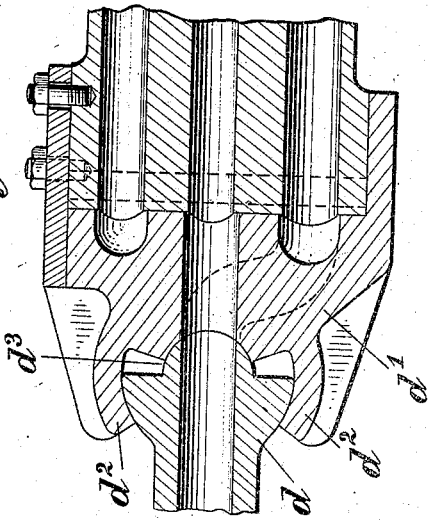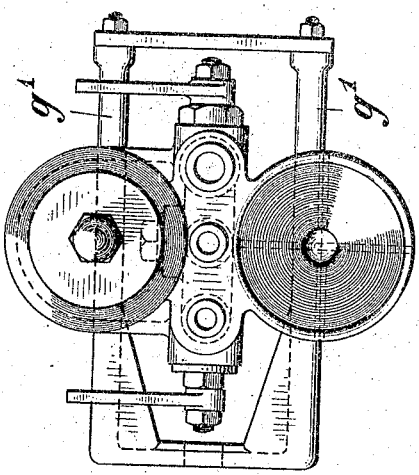

JOHN L. MOHUN, OF NEW YORK, N. Y.

AUTOMATIC PIPE-CONNECTOR.

No. 924,485.  Specification of Letters Patent.  Patented June 8, 1909.

Application filed February 17, 1908. Serial No. 416,256.

*To all whom it may concern:*

Be it known that I, JOHN L. MOHUN, a citizen of the United States, and a resident of the borough of Brooklyn, of the city of New York, in the State of New York, have invented certain new and useful Improvements in Automatic Pipe-Connectors, of which the following is a specification, reference being had to the accompanying drawings, forming a part hereof.

Where hand couplings are employed on railway trains to connect the different pipe lines thereon, such as the steam line, the train line and the signal line, it is necessary for the trainmen to go in between the cars to make the required connections; and this not only consumes considerable time but is a frequent source of accident.

The object of the present invention is to provide an automatic pipe connector, to save the time required in coupling and reduce the liability to accident incident to the use of hand connecting devices. It is particularly desirable in such devices to avoid the use of flexible hose as such hose frequently bursts and is often a source of accident. The present improvements provide a sufficient range and freedom of movement for the connector head and the connector as a whole whereby the use of flexible hose is wholly obviated. In order to give the connector and the connector head the required movement, the connector head is arranged to slide upon the connector body, plungers being provided to maintain the continuity of the pipe line passages; a universal joint of novel construction is arranged between the connector body and its base, the joint itself being provided with passages corresponding to the different lines whereby the lines extend through the joint; and the base of the connector is hinged or pivoted to the car body so that the connector as a whole may have a swinging or twisting movement as is required at a crossover or when the train is entering or leaving a curve. Moreover, in accordance with the invention, the forward portion of the coupler is supported by a yoke or some equivalent device which may be secured to the car coupler, said yoke not only serving to support the forward end of the connector when the latter is free or uncoupled but also serving to center the same or bring it in the proper position for coupling as will be explained more fully hereinafter.

The improvements also include a novel means for removing and replacing the gaskets in the ports of the connector face whereby it is not necessary to uncouple two connectors in order to remove a defective gasket.

Finally, the improvements include an improved form of piston packing which is designed to be employed in connection with the present improvements.

Referring to the accompanying drawings:—Figure 1 is a plan view of one embodiment of the improved pipe connector. Fig. 2 is a view in side elevation, the dotted lines above the same indicating a car coupler which in the present case is arranged to have a lateral swing. Fig. 3 is a view in front elevation. Fig. 4 is a sectional detail view upon an enlarged scale of a piston packing which may be employed in the improved connector. Fig. 5 is a similar view of one of the gaskets in the connector face and of the improved means for holding the same upon its seat, and Fig. 6 is an enlarged detail view showing a modification of a universal joint which may be employed in the improved connector.

In the present case, the connector chosen for the purpose of illustrating and explaining the invention is adapted to couple the signal, train and steam lines, but as the description proceeds it will be obvious that it is immaterial to the invention whether one or more lines are embodied in the improved structure. The three pipes corresponding with the aforementioned lines enter what may be referred to as the base $a$ of the connector, through which it is supported from underneath a car body, such base being preferably cast to receive the three pipes in a horizontal plane in which position relative to each other they may be most conveniently secured to the under-side of the car. In addition to the horizontal and vertical movements of the connector which are required for bringing the connector head into engagement with a coöperating connector head on another car and for maintaining such engagement, provision is made to permit the connector to have a slight swinging or twisting movement so that it may accommodate itself to the twisting strain which is produced at a crossover or curve. Such provision is made by supporting the base $a$ from a horizontal pivot $a'$ arranged longitudinally of the connector, that is in the direction the connector extends. The three pipes leading into the connector are preferably fastened to the car body at some distance back of the connector thus giving them the necessary flexibility to accommodate themselves to this very slight movement of the connector. Of course such flexibility may be imparted by any other suitable means.

The face $b$ of the connector constitutes the forward portion of the connector head which is slidable in or upon an intermediate member $c$ and the latter is secured to the base $a$ by means of a universal joint. This universal joint comprises two similar independent joints, one for permitting the connector to have movement in a vertical plane and the other for permitting a connector to have movement in a horizontal plane. Each joint comprises a substantially semi-cylindrical member $d$, a second substantially semi-cylindrical member $d'$ having jaws $d^2$ embracing the member $d$ and a tapered plug cock $d^3$ interposed with a tight working fit between the two members $d$ and $d'$. As arranged in the drawing, the forward one of these two joints has its plug cock disposed in a vertical position and the corresponding member $d$ is integral with a casting $c'$ forming a part of the member $c$, while in the other joint the plug cock is horizontally disposed and the corresponding member $d$ is formed integral with the base casting $a$. Both of the members $d'$ are formed in one integral casting $d^4$ which casting, as well as the castings $a$ and $c'$, are properly cored to provide the desired number of passages according to the number of lines to be incorporated, all as clearly indicated by dotted lines in Figs. 1 and 2. The tapered cocks are provided with a cofresponding number of ports or passages $d^5$ which are arranged to register with the passages in the castings and thus to preserve the continuity of the lines through the joints. For this purpose the smaller end of each cock may be provided with a squared portion $d^6$ for insertion into a corresponding recess in a cap $d^7$ covering one end of each joint, in order to hold the cock stationary. Moreover, the ports in the cocks may be slightly larger than the passages in the castings as indicated in the drawings, or their ends may be made flaring in order not to restrict the passage of fluid through any line as the connector is moved. In assembling the joints, the member $d$ is slid into the member $d'$ and is retained by a flange $d^8$ on the member $d'$ at one end, and by the cap $d^7$ which is secured to the member $d'$ and over the member $d$ at the other end. The tapered cock $d^3$ is then inserted at the first mentioned end, and is yieldingly held in place by a spring $d^9$ interposed between the outer end of the cock and a fastening nut $d^{10}$, and serving to keep the cock in close working contact with the members $d$ and $d'$. For the purpose of reducing the extent of the working surface in each joint, it may be preferable to form the plug cock $d^3$ integral with the member $d$ or the member $d'$, and in Fig. 6 a modification of the construction shown in Figs. 1 and 2 is illustrated, showing the plug cocks formed integral with the member $d$.

Screwed into the casting $c'$ are pipes $c^2$, one for each passage in this casting, and these pipes are preferably formed with hexagonal shoulders $c^3$ integral therewith for more conveniently fastening the pipes in place. The pipes extend into passages formed in the rear portion $b'$ of the slidable connector head thus constituting plungers or pistons, suitable packing being provided to give them a tight working fit in said passages. This packing preferably comprises asbestos graphite rings $e$, the gland $e'$ and a resilient split ring $e^2$ the ends of which tend to draw together and which ring acts as a spring to take up automatically the wear upon the packing rings. The split ring is preferably made of steel and is beveled at either one or both ends to coöperate with a beveled end upon the gland or a beveled end upon the outer packing ring or both as the case may be. When the packing becomes worn it is obvious that the ring, tending as it does to draw its ends together, will keep the packing tight. As shown in the drawing there are three glands $e'$ cast in one integral piece for convenience in construction and manipulation.

In order to keep the faces of the two connectors together, a suitable pressure must be applied to the connector head acting at all times to force the head forward. It will be obvious that with the plunger arrangement just described, the pressure in each of the lines of the system will tend to press the head forward and to keep the connecting faces together. Besides the pressure thus supplied is that of two springs $f$ which are provided one on each side of the pipes $c^2$, pockets or seats for these springs being formed in the casting $c'$ and in the rear end $b'$ of the casting forming the connector head. Surrounding the springs and the pipes $c^2$ is a shield $c^3$ secured to the casting $c'$, which shield serves to house the springs $f$ and to protect the pipes $c^2$ from dust and dirt which would otherwise interfere with the proper action of the plungers. The forward movement of the head is limited by what may be referred to as a supporting or centering member $g$ which is fastened to the under-side of the car coupler indicated by dotted lines in the drawing and designated by the letter $h$. This member is shown in the present case as a yoke having two vertical members $g'$ with concave surfaces presented to the rear portion of the head. This rear portion of the head is dished on each side at $g^2$ and these dished portions, as shown in the drawings, bear upon the vertical members of the yoke. When coupling takes place, it will be understood that the head is moved backward and held by the adjacent head, whereby it is entirely free of the yoke; and when the head is uncoupled it moves forward again, the dished surfaces $g^2$, through the action of the springs $f$, bringing the head into right and left center while the convexity of the bearing surfaces on the vertical members of the yoke brings the head into the proper vertical position for the next engagement. It will be obvious that the coöperating surfaces upon the yoke and connector head may be formed in various different ways to effect the ends just described. Moreover, the vertical members, in the present case are shown relatively near together, being used in connection with a laterally swinging car coupler, as was stated above. In case the car coupler did not have the swinging movement referred to, it is obvious that the vertical members would have to be arranged farther apart to permit the connector head to have a sufficient range of movement. A narrow portion $b^2$ of the head extends through the yoke and is made sufficiently long so that the forward portion of the head, that is the face $b$, will not come in contact with or interfere with the yoke when the former is retracted and coupled to an adjacent connector head. It will be seen from Figs. 1 and 2 that the parts are arranged so that the head, in its forward or uncoupled position, is somewhat in advance of the pulling face $x$--$x$ of the knuckle of the car coupler, thereby insuring the proper amount of compression between the faces of two connectors when coupled. The face is provided with male and female members $b^3$ and $b^4$, for "gathering" the heads together in effecting a coupling and causing the ports to register, all as will be readily understood.

Each of the ports in the end of the face is provided with a gasket, and in accordance with the present invention means are provided for retaining the gaskets in such a way that they can be removed without uncoupling the two adjacent connectors. For this purpose, openings are formed in the sides, or, what is the same thing, in the top or bottom of the connector heads, and wedges $i$ are inserted therein bearing upon the rear ends of the gaskets or upon washers interposed between the gaskets and the wedges and are drawn up and held in place by cap nuts $i^2$. As ordinarily provided, the gaskets for the train line and signal line are of a soft or yielding material while those employed in the steam line are rigid. As, therefore, the soft gaskets will yield to some extent when the coupling takes place, some provision must be made to permit the hard or rigid gasket in the steam port to have a correspondingly limited movement. This is taken care of by providing a piston $k$ and a resilient ring $k'$ similar to the ring shown in connection with the packing (Fig. 5); the coöperating beveled surfaces on this ring and the piston will satisfactorily retain the gasket in place while readily permitting it to adjust itself properly to effect a uniform and perfect coupling between the ports in one connector and those in the abutting connector. The steam line, moreover, is provided with a cock $l$ preferably having an escape for the condensation and the train and signal lines with a common cock $m$, such cocks being provided with handles above and below the connector head respectively.

When, as in the present case, both steam and air passages are incorporated in the connector, it is desirable to prevent the heat of the steam from being communicated to the air passages. For this purpose, the conductivity of the connector is greatly reduced by coring the castings, as indicated in the head of the connector at $n$ and $o$, in the stem of the connector at $p$ and in the base of the connector at $r$, thus permitting the outside air to circulate freely therethrough to keep the castings cool.

It will be obvious that some features of the connector may be employed in other devices than connectors and it is of course understood that none of the improvements illustrated and described herein are limited to embodiment in or application to a connector.

I claim as my invention:—

1. In a pipe connector having one or more passages, the combination of a connector head, a base adapted to be attached to a support for the connector, and a joint embodying a tapered plug interposed intermediate the head and base and through which the passage or passages extend.

2. In a pipe connector having one or more passages, the combination of an extendible connector head, a base adapted to be attached to a support for the connector, and a universal joint embodying two tapered plugs intermediate the head and base and through which the passage or passages extend.

3. In a pipe connector having one or more passages, the combination of a connector head, a base, means to pivot the base to a support, and a universal joint intermediate the head and base and through which the passage or passages extend.

4. In a pipe connector having one or more passages, the combination of an extendible connector head, a base, means to pivot the base to a support, and a universal joint intermediate the head and base and through which the passage or passages extend.

5. In a pipe connector having one or more passages, the combination of a connector head, a base adapted to be attached to a support for the connector, a joint to permit horizontal movement of the head and a joint to permit vertical movement of the head both intermediate the head and base and through both of which joints the passage or passages extend.

6. In a pipe connector having one or more passages, a joint comprising a substantially semi-cylindrical member, a second substantially semi-cylindrical member having jaws to embrace the first member, and a plug cock interposed between said members.

7. In a pipe connector having one or more passages, a joint comprising a substantially semi-cylindrical member, a second substantially semi-cylindrical member having jaws to embrace the first member, and a tapered plug cock interposed between said members.

8. In a pipe connector having one or more passages, a joint comprising a substantially semi-cylindrical member, a second substantially semi-cylindrical member having jaws to embrace the first member, a tapered plug cock interposed between said two members, means to hold said cock from turning, and a spring acting against the head of said cock.

9. In a pipe connector having one or more passages, a joint comprising a substantially semi-cylindrical member, a second substantially semi-cylindrical member having jaws to embrace the first member, and a plug cock interposed between said members and integral with one of said members.

10. In a pipe connector having one or more passages, a joint comprising a substantially semi-cylindrical member through which the passage or passages extend, a second substantially semi-cylindrical member having jaws to embrace the first member and through which the passage or passages extend, and a plug cock having a corresponding number of passages or ports and interposed between said two members, the passages or ports in the cock registering with the passages in each of said members.

11. In a pipe connector having one or more passages, the combination of a connector head, a base adapted to be attached to a support for the connector, and two joints intermediate the head and base, each of said joints comprising a substantially semi-cylindrical member, a second substantially semi-cylindrical member having jaws to embrace the first member, and a plug cock interposed between the said members.

12. In a pipe connector having one or more passages, the combination of a connector head, a base adapted to be attached to a support for the connector and two joints intermediate the head and base, the one to permit the head to move horizontally and the other to permit the head to move vertically, and each of said joints comprising a substantially semi-cylindrical member, a second substantially semi-cylindrical member having jaws to embrace the first member and a plug cock interposed between said members.

13. In a pipe connector having one or more passages, the combination of a connector head through which the passage or passages extend, a member having a corresponding number of pipes which extend into the passage or passages in the head respectively and upon which the head is slidable, a base for the coupler, and a universal joint intermediate the head and base and through which the passage or passages extend.

14. In a pipe connector having one or more passages, the combination of a connector head through which the passage or passages extend, a member having a corresponding number of pipes which extend into the passage or passages in the head respectively and upon which the head is slidable, a spring to hold the head normally in its extended position, a base for the connector, and a universal joint intermediate the head and base and through which the passage or passages extend.

15. In a pipe connector having one or more passages, the combination of a connector head through which the passage or passages extend, a member having a corresponding number of pipes which extend into the passage or passages in the head respectively and upon which the head is slidable, coiled springs interposed between the head and said member, the two latter having pockets in which the springs are seated, and a shield attached to said member and surrounding the pipes.

16. In a pipe connector, the combination of an extendible connector head, and a centering member, said head and member having coöperating surfaces whereby the bearing of the head upon the member automatically brings the member to center.

17. In a pipe connector, the combination of an extendible connector head, a centering member immovable longitudinally, means to permit the connector head to have a limited range of movement, and a spring to advance the head and coöperating with the centering member to bring the head into a predetermined position.

18. In a pipe connector, the combination of an extendible connector head, a centering member, means to permit the connector head to have a limited range of movement, and a spring to hold the head normally in engagement with said member.

19. In a pipe connector, the combination of an extendible connector head, a centering member limiting its forward movement, the head being free of said member when contracted and coupled to an adjacent connector.

20. In a pipe connector, the combination of an extendible connector head, and a centering member, the head having a coupling face in advance of said member, and a contact surface adapted to bear upon said member when the head is in its advanced position.

21. In a pipe connector, the combination of an extendible connector head and a centering yoke through which the head extends, the head having a coupling face in advance of the yoke and a contact surface back of the yoke adapted to bear upon the yoke and to bring the head into center as it advances after uncoupling.

22. The combination with a car coupler, of a pipe connector having an extendible head and a yoke secured to the car coupler through which the head extends and against which it bears in its advance position, the head being free of the yoke when contracted and coupled.

23. In a pipe connector, the combination of a base, a member embodying one or more pipes, an extendible head having passages corresponding to the pipes and into which the pipes extend as plungers, a universal joint between said member and base to give a limited range of movement to the head, springs to advance the head, and a centering member with which the springs coöperate to bring the head into a pre-determined position and which centering member is independent of the connector when the latter is contracted and coupled.

24. In a pipe connector, the combination of a base, a member embodying one or more pipes, an extendible head having passages corresponding to the pipes and into which the pipes extend as plungers, a universal joint between said member and base to give a limited range of movement to the head, springs to advance the head, and a centering member against which the head bears when advanced by the springs and which is independent of the connector when the latter is contracted and coupled.

25. The combination of a pipe connector and a horizontal pivot to support the connector and permit it to have a slight lateral swing or twist.

26. The combination of a pipe connector, a horizontal pivot arranged longitudinally of the connector to support the same, and a universal joint to permit the connector to move laterally and vertically.

27. In a pipe connector, the combination of a connector head having a port therein, a gasket seated in the port and a wedge to maintain the gasket firmly upon its seat.

28. In a pipe connector, the combination of a connector head having a port therein, a gasket seated in the port, and a wedge operating transversely of the head against the gasket and removable from the side of the head.

29. In a pipe connector, the combination of a connector head having at least two ports therein, a relatively hard gasket seated in one port, a relatively soft gasket seated in the other port, a wedge removable from the side of the head to hold the soft gasket rigidly against its seat and a wedge and spring also removable from the side of the head to hold the hard gasket yieldingly against its seat.

30. A packing device comprising a packing ring or the like, a gland, and a resilient split ring interposed between the packing ring and gland.

31. A packing device comprising a packing ring or the like, a gland, and a resilient split ring, the said ring and either the packing ring or gland having coöperating beveled surfaces.

32. A pipe connector mounted to have horizontal and vertical movements and hinged so as to have a twisting movement.

33. In a pipe connector, the combination of a connector head adapted to be extended and contracted therein, and means to permit the connector to have horizontal and vertical movements and a hinge to permit it to have a slight twisting movement.

34. In a pipe connector, the combination of an extendible head having a passage for the conduction of a pressure fluid, a pipe extending into said passage to deliver the fluid thereto, the fluid thus tending to maintain the head in its advanced position when uncoupled and against the coöperating head when coupled, and springs also tending to maintain the head in its advanced position.

35. A pipe connector having castings constituting a base, an extendible head and a stem between the base and the head, the head, stem and base having at least two passages and all being cored to permit the circulation of the outside air between said passages.

This specification signed and witnessed this 15th day of February, 1908.

JOHN L. MOHUN.

Signed in the presence of—
HOMER H. SNOW,
LUCIUS E. VARNEY.